(12) United States Patent
Zheng et al.

(10) Patent No.: US 11,232,814 B2
(45) Date of Patent: Jan. 25, 2022

(54) HIGH-SPEED PARALLEL REPRODUCING HOLOGRAPHIC DISK READING METHOD AND DEVICE

(71) Applicant: Amethystum Storage Technology Co., Ltd., Guangdong (CN)

(72) Inventors: Mu Zheng, Guangdong (CN); Tiewei Luo, Guangdong (CN); Jun Tian, Guangdong (CN); Dejiao Hu, Guangdong (CN); Yicheng Liu, Guangdong (CN)

(73) Assignee: AMETHYSTUM STORAGE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/152,170

(22) Filed: Jan. 19, 2021

(65) Prior Publication Data

US 2021/0233568 A1    Jul. 29, 2021

(30) Foreign Application Priority Data

Jan. 23, 2020  (CN) .......................... 202010077102.9

(51) Int. Cl.
| | | |
|---|---|---|
| *G11B 7/0065* | (2006.01) | |
| *G03H 1/26* | (2006.01) | |
| *G11B 7/08* | (2006.01) | |

(52) U.S. Cl.
CPC .......... *G11B 7/0065* (2013.01); *G03H 1/265* (2013.01); *G11B 7/083* (2013.01)

(58) Field of Classification Search
None
See application file for complete search history.

(56) References Cited

U.S. PATENT DOCUMENTS

| | | | | |
|---|---|---|---|---|
| 5,438,439 A | * | 8/1995 | Mok ........................ | G03H 1/26 359/10 |
| 7,187,481 B1 | * | 3/2007 | Sigel ........................ | G03H 1/20 359/10 |
| 2002/0051419 A1 | * | 5/2002 | Itoh ....................... | G03H 1/2286 369/103 |
| 2002/0075776 A1 | * | 6/2002 | Kasazumi ............ | G11B 7/1374 369/47.5 |
| 2005/0185231 A1 | * | 8/2005 | Chuang .................. | G11B 7/007 359/3 |
| 2005/0264860 A1 | * | 12/2005 | Toishi .................. | G11B 7/0065 359/22 |

(Continued)

*Primary Examiner* — Peter Vincent Agustin
(74) *Attorney, Agent, or Firm* — Muncy, Geissler, Olds & Lowe, P.C.

(57) ABSTRACT

The present patent relates to a parallel reproducing holographic disk reading method and device, and belongs to the technical field of optical holographic storage. According to an angle-shift multiplexing method included in the present patent, multiplex recording is performed by simultaneously changing an incident angle of a reference light and moving a medium with a fixed angle change amount and a fixed shift amount. In this method, the reference light can be split for incidence, and then holograms in different units can be simultaneously reproduced. According to the method disclosed by the patent, a recorded hologram can be read and written in real time, and a recorded signal can be checked under a condition of satisfying a response time required by the medium.

20 Claims, 8 Drawing Sheets

(56) References Cited

U.S. PATENT DOCUMENTS

| | | | |
|---|---|---|---|
| 2005/0270609 A1* | 12/2005 | Chuang | G11B 7/28 359/22 |
| 2008/0037085 A1* | 2/2008 | Gabor | G11B 7/1381 359/24 |
| 2009/0161519 A1* | 6/2009 | Yamamoto | G11B 7/0065 369/103 |
| 2021/0233568 A1* | 7/2021 | Zheng | G11B 7/14 |

* cited by examiner

HIGH-SPEED PARALLEL REPRODUCING HOLOGRAPHIC DISK READING METHOD AND DEVICE

CROSS REFERENCE TO RELATED APPLICATIONS

The present application claims priority from Chinese Patent Application No. 202010077102.9 filed on Jan. 23, 2020, all of which are hereby incorporated herein by reference.

TECHNICAL FIELD

The invention belongs to the technical field of optical holographic storage, in particular to a holographic recording/reproducing method and device combining angle multiplexing and shift multiplex recording.

BACKGROUND ART

A reference light used by an angle multiplex recording method is a plane wave, and multiplexing/recording is achieved by changing an angle at which a reference beam is incident on a recording medium. According to the method, a hologram cannot be reproduced just by changing an incident angle of a reference light by about 0.1°, so that a new hologram can be recorded at this angle, and the above is repeated multiple times for a multiplexed recording of about 100 times. In this method, angle selectivity is determined by the Bragg condition. The intensity of a reproduction light is quite sensitive to angle change since a thick film medium is used, and a reproduction light intensity is greatly reduced when the angle change is 0.1°. However, since an incident position of each hologram and the incident angle of a signal light is a fixed value, noise will be accumulated during multiplex recording, that is, a cross-write noise, thereby reducing a signal-to-noise ratio. In addition, a variation range of the incident angle of the reference light is limited. Since accumulation of noise and the variation range of the incident angle simultaneously limit storage capacity of a system, a shift multiplex recording technique that is not constrained by the two conditions are introduced into an angle multiplexing method to increase the storage capacity of the system. On the other hand, another patent application by the same applicant has proposed that the storage capacity can be increased by combining angle multiplexing and shift multiplexing, and it can be known that the storage capacity of about 600 TB to 1.2 PB can be achieved by using a disk having a diameter of 120 mm according to theoretical calculation results. As the capacity of the disk increases, high-speed recording/reproducing becomes a major problem, and under this background, the present patent discloses a high-speed reproducing holographic disk reading method and device.

SUMMARY OF THE INVENTION

The present patent aims to overcome at least one of the deficiencies in the prior art, and provides a high-speed parallel reproducing holographic disk reading method and device.

A high-speed parallel reproducing holographic disk reading method, which is characterized in that multiplex recording of a hologram is performed by linearly moving a medium and changing an incident angle of a reference light at each shift position, and the reference light is split to enter a corresponding position to form the hologram and realize high-speed parallel reading of information in a reproduction process.

Specifically, split reference lights are incident on a storage medium at a same incident angle.

Specifically, a reading position of a multiplex recording hologram is adjusted by changing an interval of each reference light.

Specifically, hologram sequences in a direction perpendicular to a shift direction are parallel to each other so as to realize parallel reading.

Specifically, the incident angle and a wavelength of each light beam can be determined at a time when it is required to correct each reference light of the Bragg condition.

Specifically, incident angles of multiple reference lights can be changed independently to improve a signal-to-noise ratio when the Bragg condition is broken.

The patent further provides a holographic recording/reproducing device with high-speed reading for realizing the above-mentioned method.

In the high-speed parallel reproducing holographic disk reading method, for the storage medium including at least shift multiplexing, in the reproduction process, the reference light is split to enter a plurality of different positions on the storage medium at the same angle at which shift multiplex recording is performed respectively, so that parallel reading of holograms at different positions is realized.

In the high-speed parallel reproducing holographic disk reading method, for the storage medium including at least angle-shift multiplexing, in the reproduction process, the reference light is split to enter the plurality of different positions on the storage medium, and the incident angles are obtained at the plurality of different positions during angle multiplex recording.

In the high-speed parallel reproducing holographic disk reading method, for the storage medium including at least unit storage, angle-shift multiplexing storage is used in each unit, the reference light is split into multiple reference lights that correspond to multiple incident positions on the storage medium spaced apart by a shift step in the reproduction process, and the incident angles are obtained at the plurality of different positions in a unit during the angle multiplex recording.

Specifically, the incident angles of multiple split reference lights differ by an equal angle a.

Specifically, an incident position of the reference light in the unit is changed by movement, and all the incident angles of the multiple reference lights after splitting are changed accordingly and synchronously according to reference light angles corresponding to different incident positions during recording.

A regularity of hologram recording in the unit is shift multiplexing in an x direction and the shift multiplexing in a y direction perpendicular to the x direction, a shift step dx in the x direction is different from a shift step dy in the y direction. During recording, when a distance dx is moved, the incident angle of the reference light changes at $\Delta\theta$; and when a distance dy is moved, the incident angle of the reference light changes at a.

Further, the multiple reference lights after splitting are distributed along the y direction, and the incident angles differ by the equal angle a in the reproduction process.

Further, in the reproduction process, the incident position of the reference light in the unit is changed by moving along the x direction, the incident position changes at the distance dx, and all the incident angles of the reference light are synchronously changed at $\Delta\theta$.

In the high-speed parallel reproducing holographic disk reading method, for the storage medium including at least unit superposition storage, angle-shift multiplexing storage is used in each unit, the reference light is split in the reproduction process, the multiple reference lights after splitting correspond to multiple incident positions spaced apart by a storage unit superposition size on the storage medium, and the incident angles are obtained at the plurality of different positions in the unit during the angle multiplex recording.

Specifically, the multiple reference lights after splitting have the same incident angle, and the incident position in each unit is in the same location.

Specifically, the incident position of the reference light in the unit is changed by movement, and all the incident angles of the multiple reference lights after splitting are changed accordingly and synchronously according to the reference light angles corresponding to different incident positions during the recording.

The regularity of the hologram recording in each unit at least includes the shift multiplexing in the x direction, the shift step in the x direction is dx, the distance dx is moved when recording is performed, the incident angle of the reference light changes at $\Delta\theta$, and a size width of holographic image information in the x direction is defined as Rx, dx=Rx/n, n is a number of times of the shift multiplexing of the hologram in the x direction, a size of the unit in the x direction is 2Rx, the storage medium includes a plurality of units superposed with each other at least in the x direction, and a size of a superposed region of two different units superposed with each other is Rx.

Further, in the reproduction process, the multiple split reference lights are distributed along the x direction, and the incident positions differ by Rx or an integer multiple of Rx.

Further, in the reproduction process, the incident position of the reference light in the unit is changed by moving along the x direction, the incident position changes at the distance dx, and all the incident angles of the reference light are synchronously changed at $\Delta\theta$.

Based on the above principles, the present patent further provides a parallel checking method in a holographic disk recording process in which the reference light is split into at least two beams, in which one beam of the reference light is a recording reference light that interferes with a signal light to record information on a holographic disk, and the other beam of the reference light is a checking reference light for reading the information recorded on the holographic disk to form a checking signal that is used for checking whether the information is recorded correctly or not.

Specifically, the recording is realized by adopting a shift multiplexing method, and the checking reference light has the same incident angle with the recording reference light, both of which are positioned at a distance of an integer multiple of the shift step.

Specifically, the recording is realized by adopting an angle-shift multiplexing method, the incident position of the recording reference light moves at the shift step dx, the incident angle changes by AO, the checking reference light has the same change rule for the incident angle with the recording reference light, and when positioned at a distance of an integer i times with a shift step L, i=L/dx, the incident angle lags behind the recording reference light by $\Delta\theta\times i$.

Based on the above-mentioned reading method, the present patent provides a high-speed parallel reproducing holographic disk reading device including at least a light source, a reference optical path, a reading device and a medium platform. The light emitted by the light source is divided to form a reference light transmitted along the reference optical path, the reference light generates signal light reproduction on a storage medium supported by the medium platform, and the reading device reads the signal light. A beam splitter for splitting the reference light is also provided to split lights to enter a plurality of different positions on the storage medium at the same angle at which the storage medium is recorded to form multiple different signal lights that are read by a plurality of reading devices.

Specifically, for the storage medium that reads shift multiplexing, the beam splitter splits the reference light to enter a plurality of different positions on the storage medium at the same angle at which the shift multiplex recording is performed respectively, so that parallel reading of holograms at different positions is realized.

Specifically, for the storage medium that reads angle-shift multiplexing, the beam splitter splits the reference light to enter a plurality of different positions on the storage medium, and the incident angles are obtained at the plurality of different positions during the angle multiplex recording.

Specifically, for the storage medium that reads unit storage, angle-shift multiplexing storage is used in each unit, the beam splitter splits the reference light, the multiple reference lights after splitting correspond to multiple incident positions spaced apart by a shift step, and the incident angles are obtained at the plurality of different positions in the unit during the angle multiplex recording.

Specifically, the regularity of the hologram recording in the unit is the shift multiplexing in the x direction and the shift multiplexing in the y direction perpendicular to the x direction, the shift step dx in the x direction is different from the shift step dy in the y direction. During recording, when the distance dx is moved, the incident angle of the reference light changes at $\Delta\theta$; and when the distance dy is moved, the incident angle of the reference light changes at a.

Specifically, after being split by the beam splitter, the multiple reference lights are distributed along the y direction, and the incident angles differ by the equal angle a.

Specifically, after splitting by the beam splitter, the medium platform supports the storage medium to move along the x direction and change the incident position of the reference light in the unit, the incident position changes at the distance dx, and the beam splitter adjusts all the incident angles of the reference light with synchronous change of $\Delta\theta$.

Specifically, for the storage medium that reads the unit superposition storage, the angle-shift multiplexing storage is used in each unit, the beam splitter splits the reference light, the multiple reference lights after splitting correspond to multiple incident positions spaced apart by the storage unit superposition size on the storage medium, and the incident angles are obtained at the plurality of different positions in the unit during the angle multiplex recording.

The regularity of the hologram recording in each unit at least includes the shift multiplexing in the x direction, the shift step in the x-direction is dx, the distance dx is moved when recording is performed, the incident angle of the reference light changes at $\Delta\theta$, and the size width of the holographic image information in the x direction is defined as Rx, dx=Rx/n, n is the number of times of the shift multiplexing of the hologram in the x direction, the size of the unit in the x direction is 2Rx, the storage medium includes a plurality of units superposed with each other at least in the x direction, and the size of the superposed region of two different units superposed with each other is Rx.

Further, after being split by the beam splitter, the multiple reference lights are distributed along the x direction, and the incident positions differ by Rx or the integer multiple of Rx.

Further, after splitting by the beam splitter, the medium platform supports the storage medium to move along the x direction and change the incident position of the reference light in the unit, the incident position changes at the distance dx, and the beam splitter adjusts all the incident angles of the reference light with synchronous change of $\Delta\theta$.

Based on the above-mentioned checking method, the present patent provides a holographic disk recording/reproducing device including a light source, a reference optical path, a signal optical path, a reading device and a medium platform. The light emitted by the light source is divided to form a reference light transmitted along the reference optical path and a signal light transmitted along the signal optical path, the reference light interferes with the signal light on a storage medium supported by the medium platform to form holographic storage image information. A beam splitter is also provided for splitting the reference light into at least two beams, in which one beam of the reference light is a recording reference light that interferes with the signal light for recording information on a holographic disk, and the other beam of the reference light is a checking reference light for checking whether the recorded information is correct or not. Signal light reproduction is generated on the storage medium supported by the medium platform, and the reading device reads the signal light.

Specifically, for the storage medium that reads shift multiplexing, the beam splitter splits the reference light, and the checking reference light has the same incident angle with the recording reference light, both of which are positioned at a distance of an integer multiple of a shift step.

Specifically, for the storage medium that reads angle-shift multiplexing, the beam splitter splits the reference light and controls the incident position of the recording reference light to move a shift step dx, the incident angle changes by $\Delta\theta$, and the checking reference light has the same change rule for the incident angle with the recording reference light, and when positioned at a distance of an integer i times with a shift step L, i=L/dx, the incident angle lags behind the recording reference light by $\Delta\theta \times i$.

Compared with the prior art, the beneficial effects of the present patent are as follows.

The present patent relates to a recording method of the hologram, which combines advantages of angle multiplexing and shift multiplexing and is provisionally referred to as an angle-shift multiplex recording method. In this method, multiplex recording of the hologram is performed by simultaneously changing the incident angle of the reference light and moving the medium with a fixed angle change amount and a fixed shift amount. Thus, if the reference light is split for incidence, the holograms in different units can be reproduced at the same time since a plane wave is used as the reference light. However, if a spherical wave is used as the reference light for shift multiplexing, this method is difficult. When using this method for multiplex recording, hologram sequences in a direction perpendicular to the shift direction have the same recording interval, corresponding positions in different hologram sequences or recording tracks of the holograms with the same incident angle of the reference light are parallel to each other, so that a reading speed can be further improved by performing simultaneous parallel reproduction on different sequences of holograms.

The method disclosed in this patent may also realize a function of read-after-write checking. In general, in a hologram recording process, a photopolymer storage medium requires a certain response time to complete a single recording, and it is impossible to check while recording. Generally, a laser with another wavelength that is not absorbed by a dielectric material can be used for illumination, and an intensity of a diffracted light can be used to achieve simultaneous reading and writing. However, from a systematic point of view, an input signal cannot be checked, and reliability of this method is still left for future consideration. However, the function of immediate reading after writing can be realized by using the method in the present patent, and the input signal is checked under the condition of satisfying the response time required by the medium.

Figure 1:
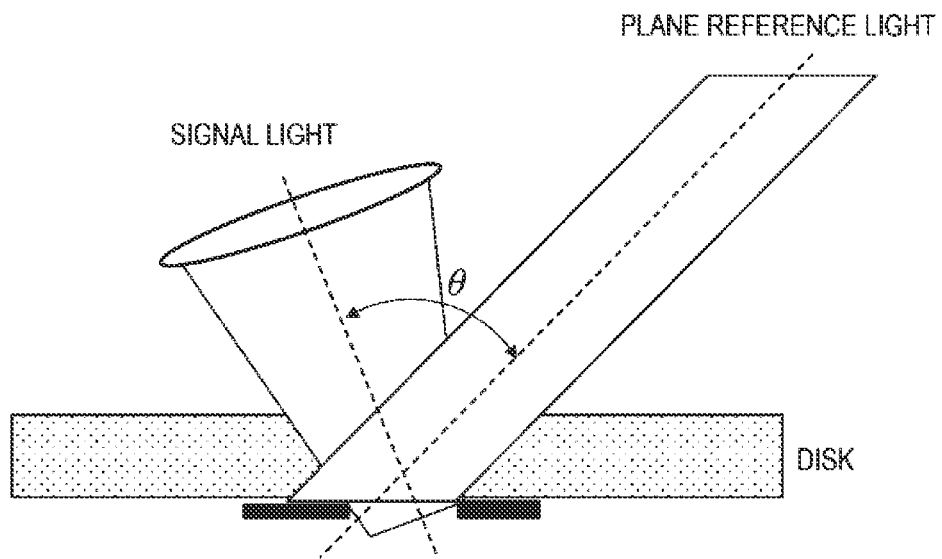
FIG. 1 is a principle diagram of angle multiplex recording.

Reference numerals: 10: laser; 20: shutter (AOM); 30: polaroid; 40: anamorphic prism group; 50: polarizing beam splitter; 51: first polarizing beam splitter; 52: second polarizing beam splitter; 60: attenuator; 70: half-wave plate; 80: mirror; 81: first mirror; 82: second mirror; 90: acousto-optic modulator (AOM) that can be replaced with a galvanometer mirror; 100: beam expanding collimator; 101: first beam expanding collimator; 102: second beam expanding collimator, 110: spatial light modulator; 120: relay lens group; 130: Fourier lens; 131: first Fourier lens; 132: second Fourier lens; 140: holographic disk; 150: camera.

DETAILED DESCRIPTION

The drawings are for the purposes of illustration only and are not intended to limit the invention. Some components in the drawings may be omitted, enlarged, or reduced for better illustrating the embodiments, and sizes of these components do not represent sizes of actual products. For those skilled in the art, it will be understood that some known structures in the drawings and descriptions thereof may be omitted.

Conventional angle multiplexing method uses a plane wave as a reference light, the principle of which is shown in FIG. 1 as a method of repeatedly achieving multiplex recording by changing an incident angle of the reference light at the same position of a medium. After a hologram is recorded a predetermined number of times at the same position, a next round of hologram multiplex recording is performed at an adjacent position that does not coincide with the above position in a similar manner. During a reproduction process of the hologram, the medium is only illuminated with the reference light, and a polytopic filter is provided to prevent crosstalk from other positions.

Figure 2:
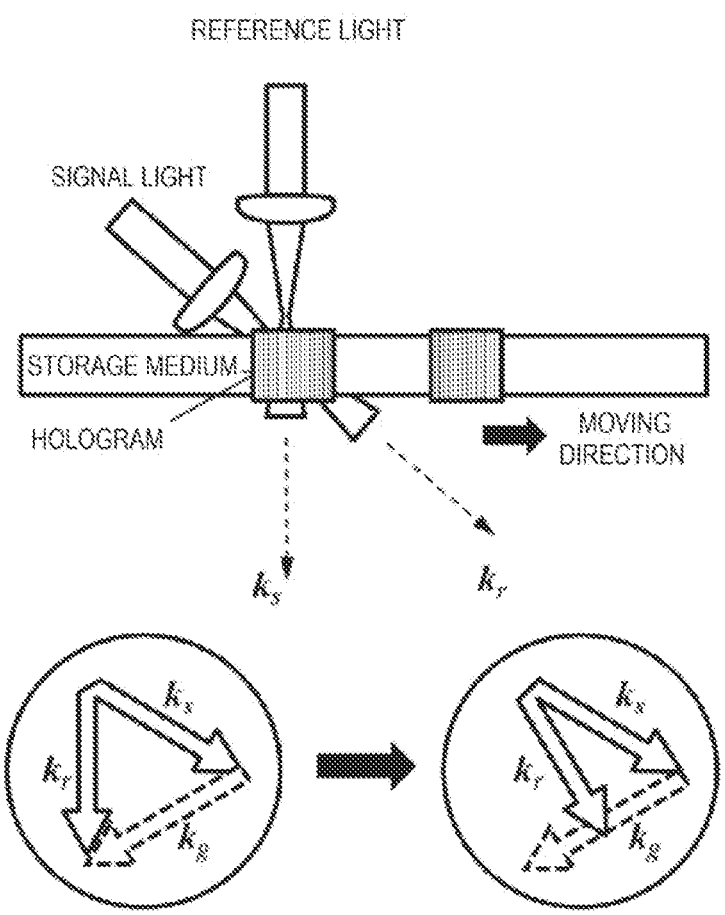
FIG. 2 is a principle diagram of shift multiplex recording.

Corresponding to FIG. 1, FIG. 2 depicts a principle of shift multiplex recording using a spherical wave as the reference light. The hologram cannot be reproduced by simply moving the medium a small distance along an axial direction after recording the hologram, and then a new hologram can be recorded to realize shift multiplexing. Specifically, when the medium is moved by several microns, the Bragg condition formed by a signal light, a reference light and a grating vector are broken, and the hologram cannot be reproduced. According to the Bragg principle, it can be known that a signal beam $k_s$, a reference beam $k_r$, and a grating vector $k_g$ jointly form a triangle, and the original triangle collapses and the hologram cannot be reproduced if the medium is only moved by several microns. However, an amount of shift for a reproduction light to disappear in the axial direction is a slight distance, and shift selectivity is extremely weak in a direction perpendicular to the axial direction. Therefore, high density recording is impossible. Therefore, the shift multiplex recording is first performed in the axial direction, recording tracks are arranged in parallel in a direction perpendicular to the shift multiplex recording, the hologram is recorded, and a two-dimensional shift multiplex recording hologram array is formed. Then, a multiplexing number is increased by using a cross-multiplex recording method in a medium plane.

Figure 3:
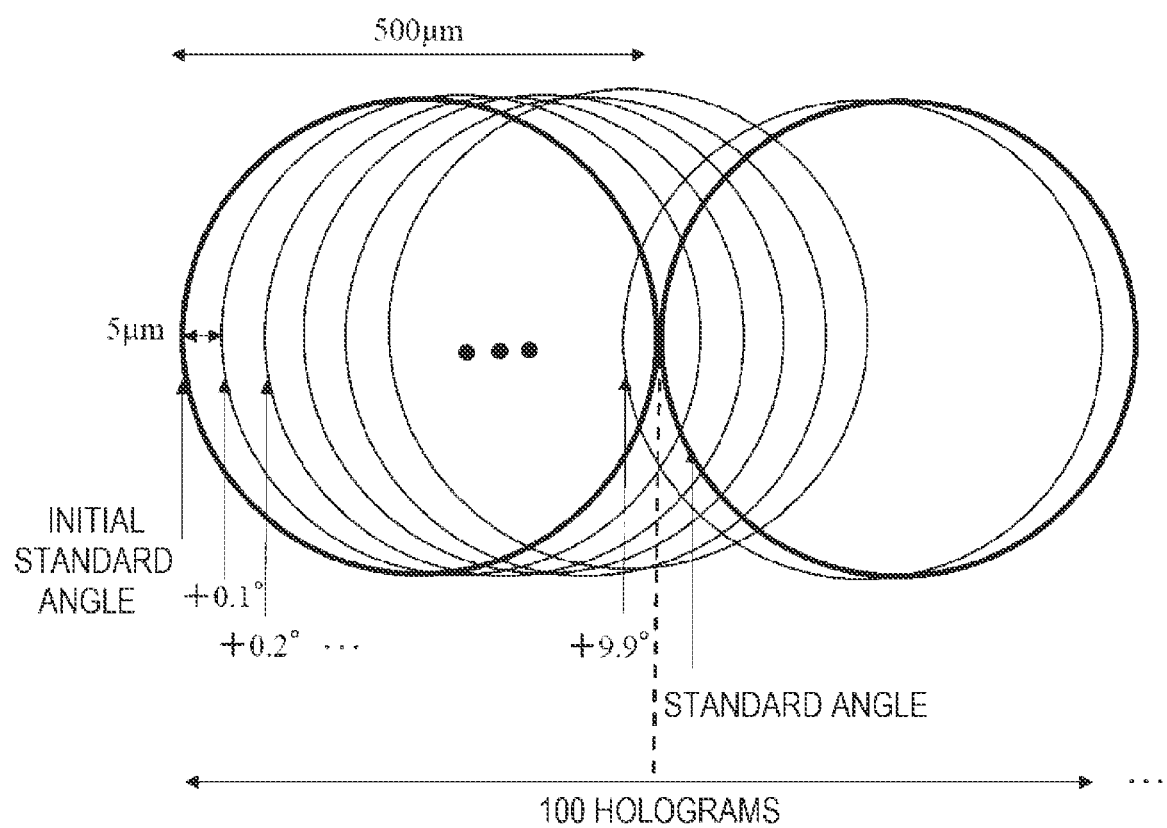
FIG. 3 is a principle diagram of angle-shift multiplex recording.

As shown in FIG. 3, a previously filed patent has proposed a method combining the above-mentioned angle multiplexing and shift multiplexing to achieve higher density storage. As shown in FIG. 3, the hologram is represented by circles having a diameter of 500 µm. A light source uses a short pulse laser to record the hologram while moving the medium to the left. Theoretically, the system can perform 800 multiplexing. As shown in FIG. 3, a first hologram is recorded at an initial incident angle. Subsequently, one hologram is recorded with each movement of dx=5 µm in the right direction while changing the incident angle of the reference light by Δθ=0.1°, and a sequence including 100 holograms is obtained in a row. Since each hologram has a different incident angle of the reference light during recording, crosstalk does not occur even when the plane wave is used as the reference light. In the holograms of this sequence, the incident angle of the reference light ranges from 0° to 9.9°. After recording 100 holograms, the next hologram does not intersect with the first hologram, so that the next sequence of holograms can be re-recorded in the right direction. Similarly, the distance of each movement is 5 µm, and each movement causes the incident angle of the reference light to change by 0.1°. That is, a shift step dx=5 µm in an x direction, a number of shift multiplexing of holographic image information in the x direction is 100 times, and the reference light changes at an equal angle Δθ=0.1° in each multiplexing.

Figure 4:
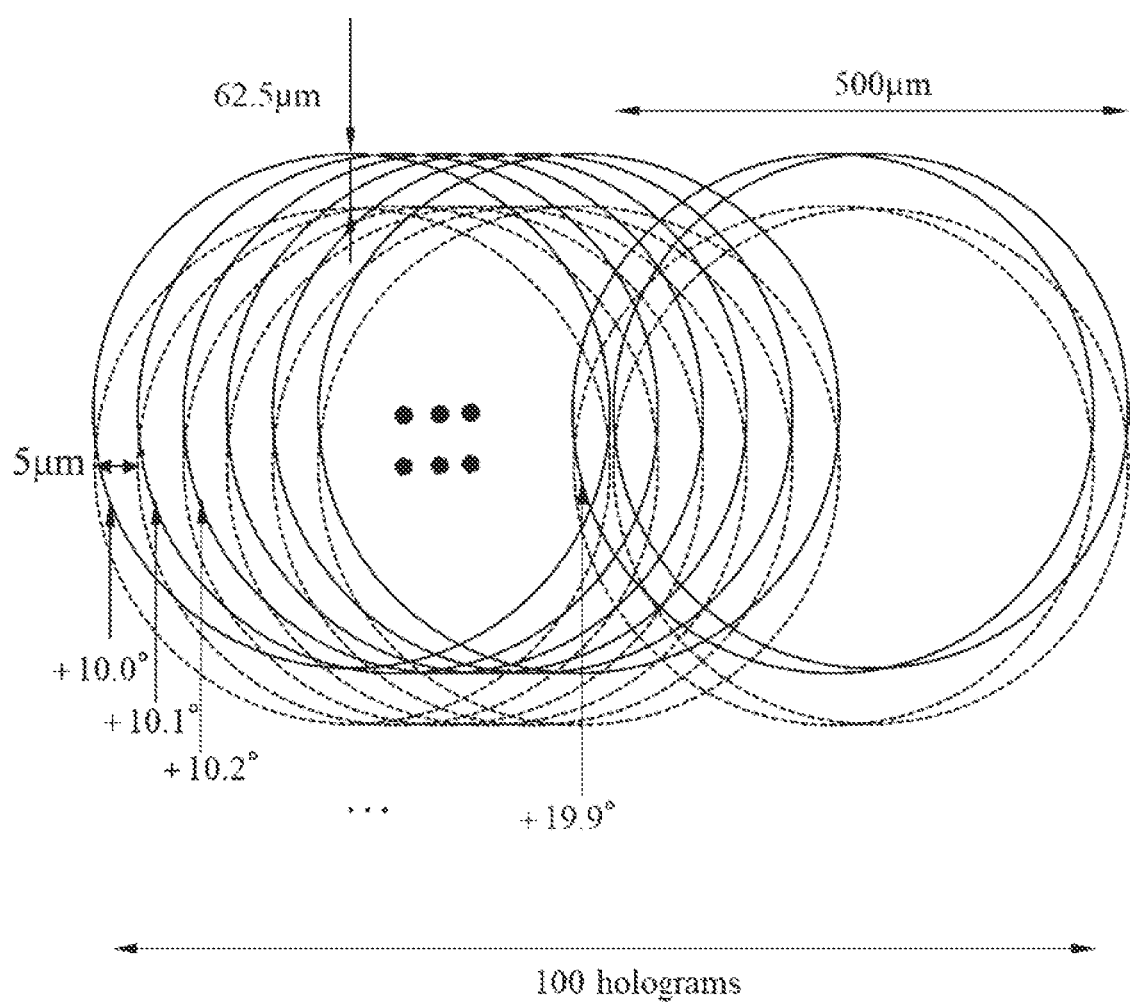
FIG. 4 is a principle diagram of two-dimensional angle-shift multiplex recording.
Figure 5:
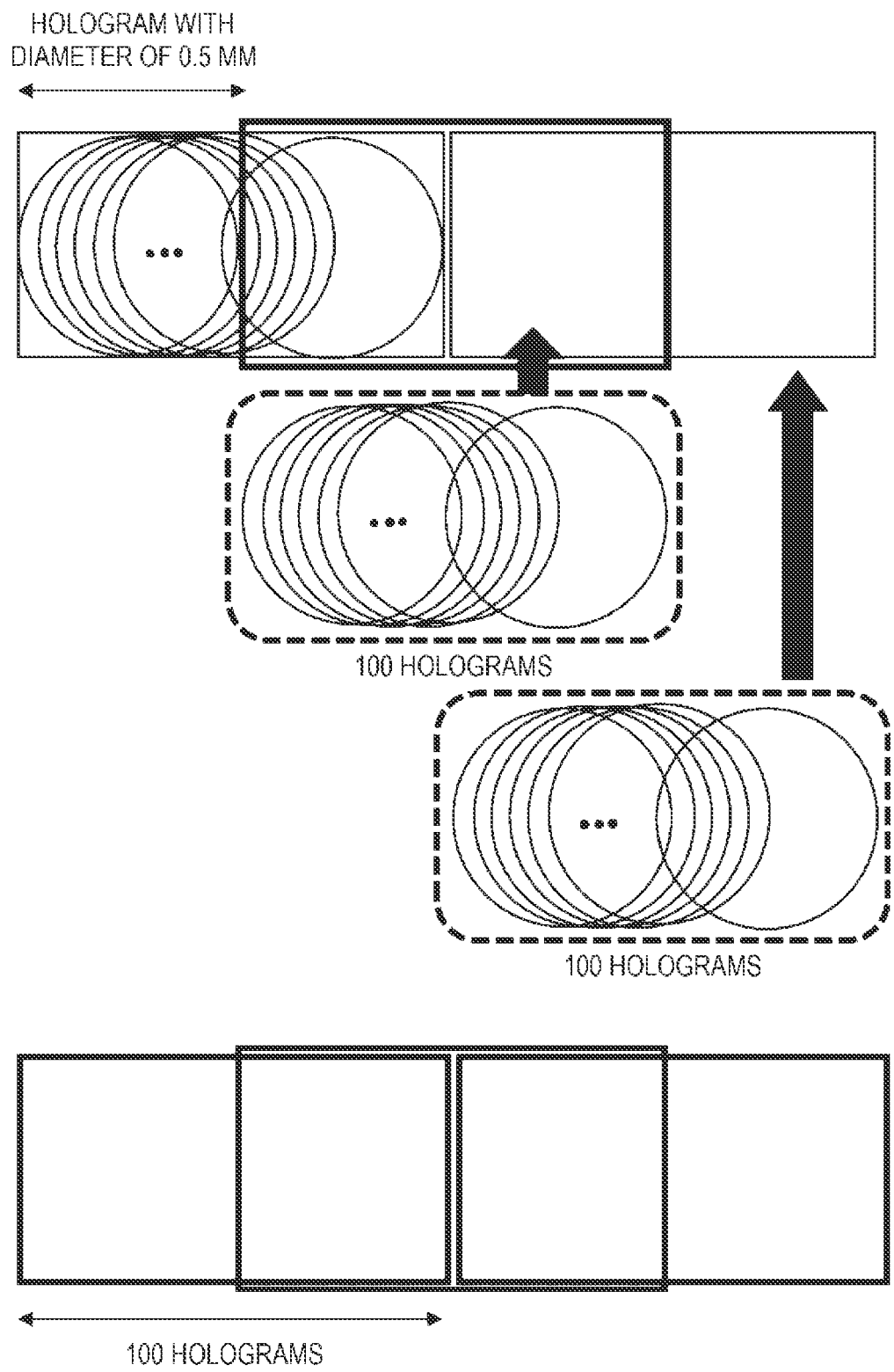
FIG. 5 is a block diagram of holograms by angle multiplexing and shift multiplex recording.
Figure 6:
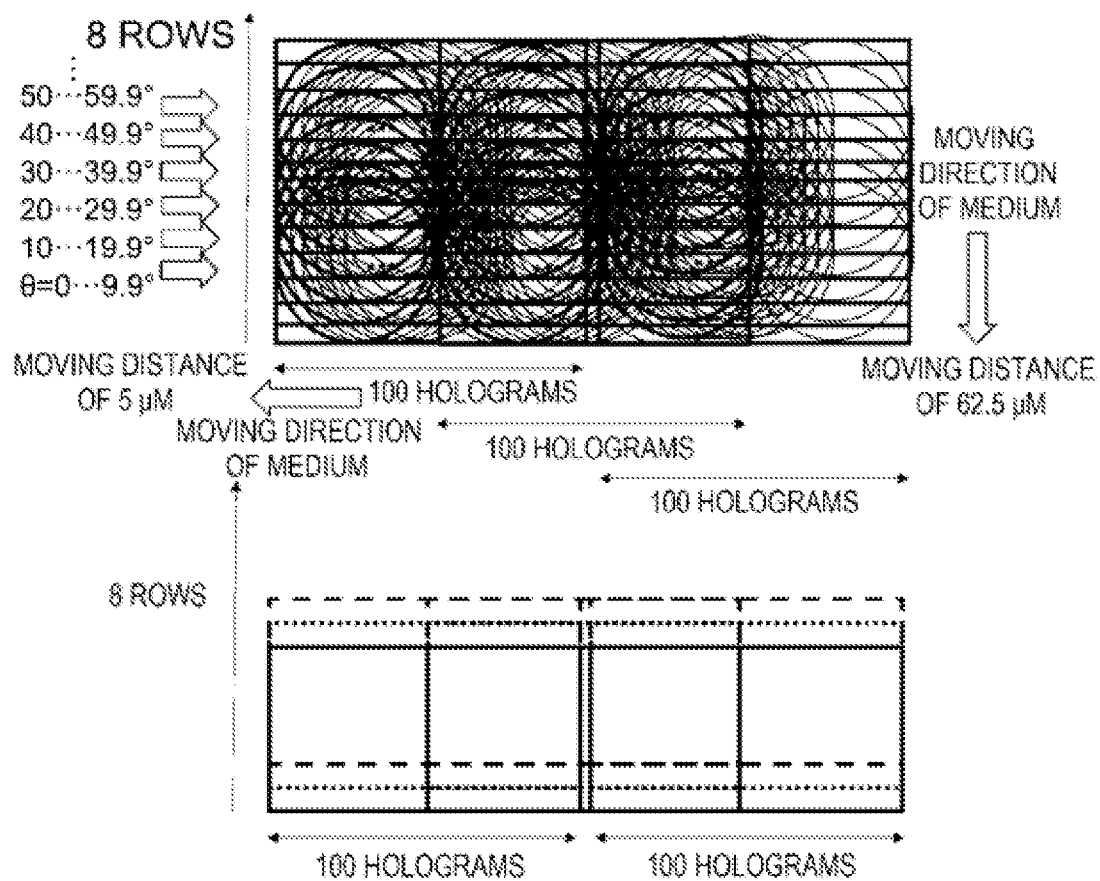
FIG. 6 is a schematic diagram of a two-dimensional angle-shift multiplex recording method.

As shown in FIG. 5, in this embodiment, the total multiplexing number is 800, a shift multiplexing number of each sequence is 100, so that the above hologram sequence can record eight holograms on the same row in the same direction. To increase the multiplexing number, a method employing two-dimensional shift multiplex recording is shown in FIG. 4, and a movement of 62.5 µm is performed in a direction perpendicular to the shift multiplexing, which are then repeated to record a new row of hologram in the right direction. Since the hologram has a diameter of 500 µm and a movement interval of 62.5 µm, holograms in the next row are completely separated from that in the first row after recording eight rows of holograms in the above manner. As shown in FIG. 6, a reference light angle for the first recording of the hologram is 0° to 9.9°, the reference light angle for the second recording of the hologram is 10° to 19.9°, and a third-row hologram sequence records 100 holograms at a reference beam angle ranging from 20° to 29.9°, and so on. Therefore, the incident angles of the reference light of the recorded holograms in a vertical direction are also different, so that crosstalk does not occur and the hologram can be reproduced independently. That is, a shift step dy=62.5 µm in a y direction, the number of shift multiplexing of the holographic image information in the y direction is eight times, and the reference light also changes at the equal angle Δθ=0.1° in each horizontal multiplexing. Starting angles of the reference light of two adjacent rows of hologram sequences differ by a=10°.

As can be seen in FIG. 6, the holographic image information is a circular holographic image, that is, Rx=Ry=500 µm, dx=5 µm, Δθ=0.1°, and a=10°.

Figure 7:
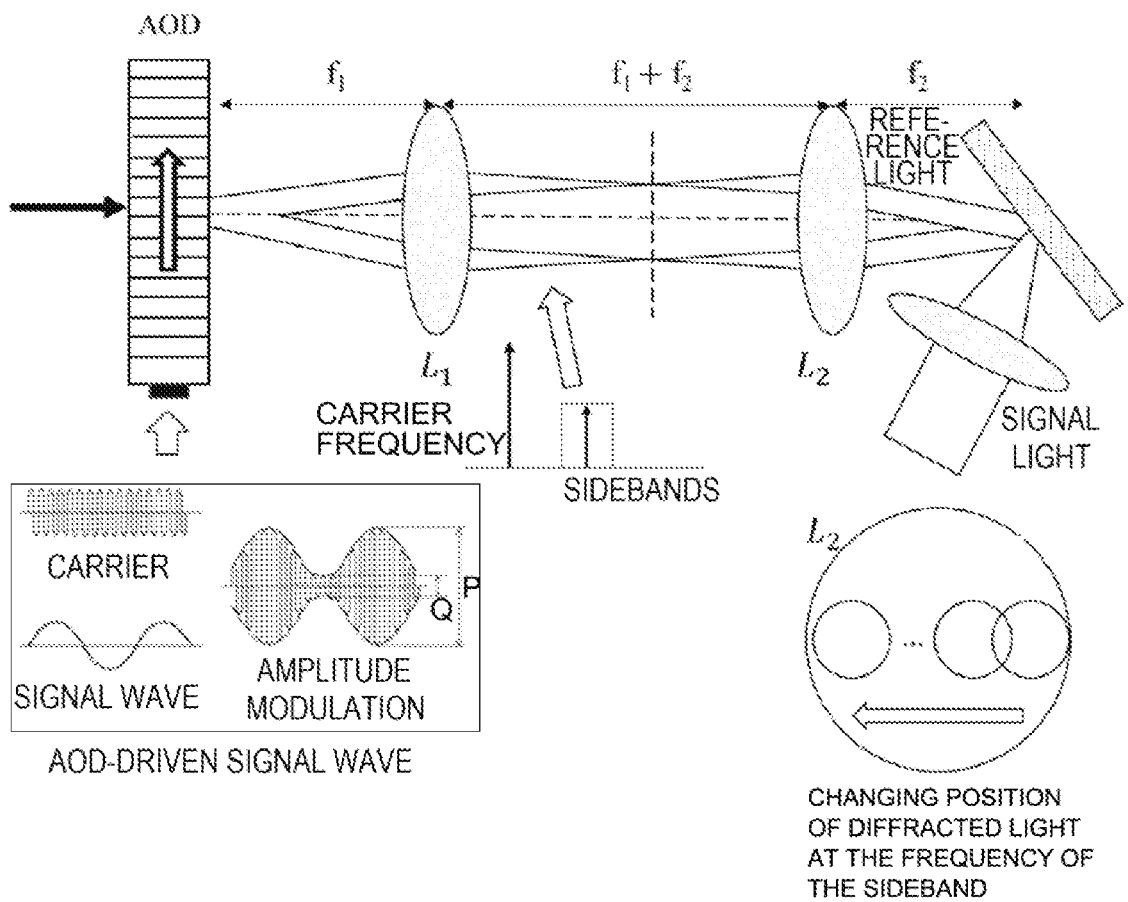
FIG. 7 is a principle diagram of angle-shift multiplex storage based on an acousto-optic modulator.

FIG. 7 is an example of a method for changing the reference light angle, which can satisfy the reference light angle required by the system to perform high-speed transformation. Herein, a method of using an ultrasonic deflector is recommended. Modulation is performed by an acousto optical deflector (AOD) via amplitude so as to generate a frequency spectrum composed of a carrier wave and sidebands and obtain a diffracted light corresponding to the sidebands. In this method, the incident angle of the reference light can be achieved by changing the frequency of an AM signal. A frequency band of the sideband is determined by a numerical aperture (NA) of lens L1, which can reach a bandwidth of several tens of MHz.

The AOD can be replaced with a galvanometer mirror.

Figure 11:
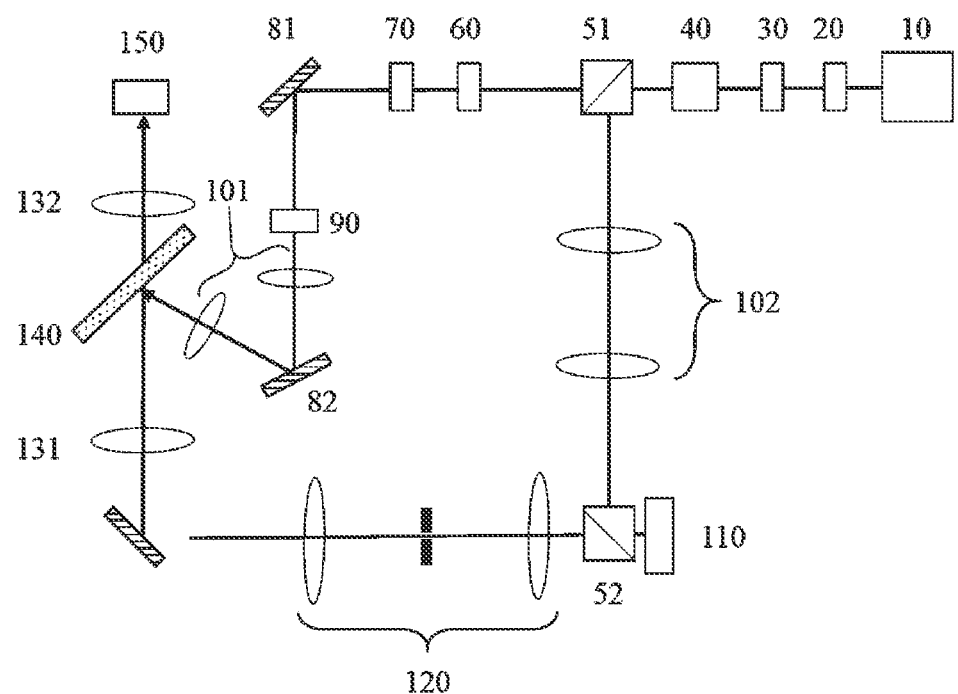
FIG. 11 is a holographic optical recording/reproducing device for high-speed parallel reproduction.

FIG. 11 is a holographic optical recording/reproducing device for high-speed parallel reproduction proposed by the present patent, which can be implemented in an optical system of conventional angle multiplex recording. As shown in FIG. 11, a high-speed parallel reproducing holographic disk reading device can be a reproduction part of a recording/reproducing device, including a laser 10 as light which passes through a shutter 20, a polaroid 30 and an anamorphic prism group 40 in succession, and is divided by a first polarizing beam splitter 51 into a reference optical path and a signal optical path. The signal light is reflected by a second polarizing beam splitting prism 52 to a spatial light modulator 110 to load a signal after passing through a second beam expanding collimator 102, passes through the second polarizing beam splitting prism 52 again, and passes through a relay lens group 120 and a first Fourier lens 131 in succession to reach a holographic disk 140. The reference light is reflected by a first mirror 81 after passing through an attenuator 60 and a half-wave plate 70 in succession, then enters an acousto-optic modulator (AOM) 90 or the galvanometer mirror for angular modulation (specific modulation principle is shown in FIG. 7), and then reaches the holographic disk 140 after being expanded and collimated by a collimating structure consisting of a second mirror 82 and a first beam expanding collimator 101. The reference light interferes with the signal light on the holographic disk 140 supported by a medium platform to form holographic storage image information. The acousto-optic modulator (AOM) 90 or the galvanometer mirror is used to control the incident angle of the reference light, so that the incident angle of the reference light is in one-to-one correspondence with the writing position of the reference light on the storage medium.

Figure 8:
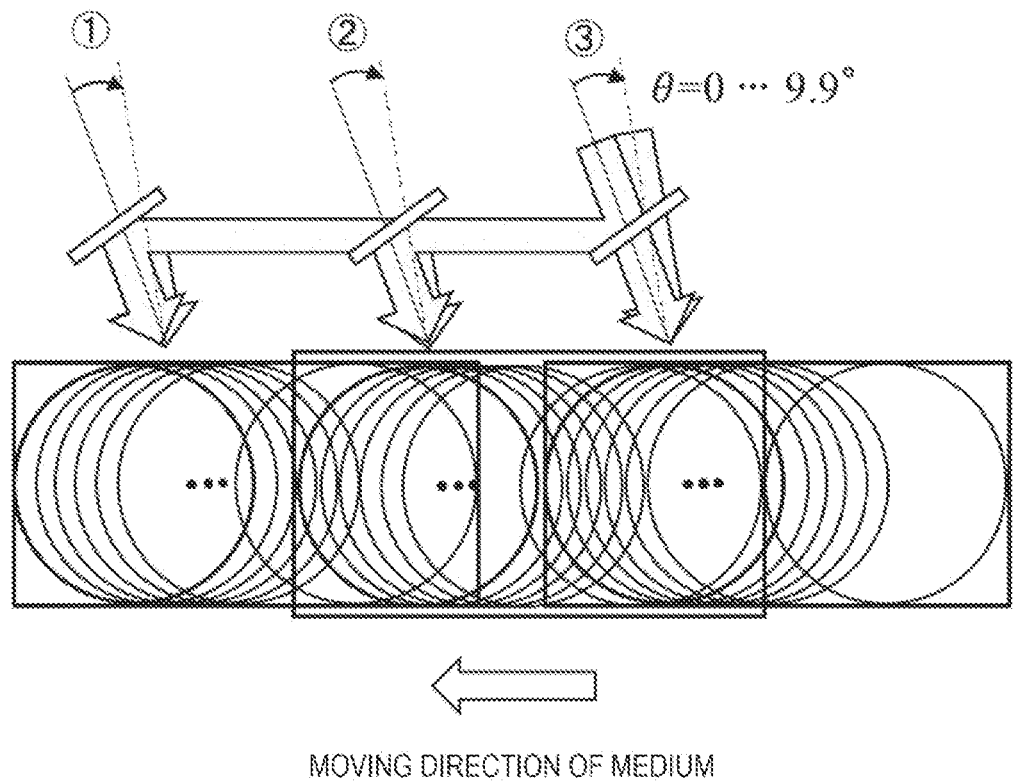
FIG. 8 is a principle diagram of parallel reading in different region blocks.

As shown in FIG. 8, when the above-mentioned system is used as a high-speed parallel reproducing holographic disk reading device, a beam splitter is also provided for splitting the reference light to respectively enter a plurality of different positions on the holographic disk 140 at the same angle at which the holographic disk 140 is recorded to form multiple signal lights. The reading device includes a plurality of cameras 150 that read different signal lights independently.

The above is a description of the recording/reproducing method in the present patent, which has been proposed in another patent and refers to an angle-shift multiplexing method. Based on this system, the present patent discloses a parallel reproducing method and device. The present patent adopts a plane wave light source as the reference light, which can easily realize beam splitting of the reference light, and each reference light can enter the storage medium at the same angle by adjusting a beam splitting mirror. In this parallel reproducing method and device, the recording of the hologram is performed using the previously proposed angle-shift multiplexing method. During reproduction, the hologram of each sequence in the same row can be separately reproduced by each split reference light. In particular, as shown in FIG. 8, when multiplex recording is performed, the optical system can adjust the incident angle of the reference light with a fixed value for each shift, each row has eight sequences each of which has 100 holograms, the holograms of each sequence are individually reproduced by split reference lights, which can realize parallel reproduction and high-speed transmission.

As described above, a regularity of hologram recording in each unit at least includes the shift multiplexing in the x direction, the shift step in the x-direction is dx, a distance dx is moved when recording is performed, the incident angle of the reference light changes at $\Delta\theta$, and a size width of the holographic image information in the x direction is Rx, dx=Rx/n, n=100 is a number of times of the shift multiplexing of the hologram in the x direction, a size of the unit in the x direction is 2Rx, the storage medium includes a plurality of units superposed with each other at least in the x direction, and a size of a superposed region of two different units superposed with each other is Rx.

The multiple reference lights are distributed along the x direction, the incident positions differ by Rx=500 µm, and the incident angle is the same. The medium platform supports the storage medium to change the incident position of the reference light in the unit along the x direction, the incident position changes at a distance dx=5 µm, and the beam splitter adjusts all the incident angles of the reference light with synchronous change of $\Delta\theta=0.1°$.

Figure 10:
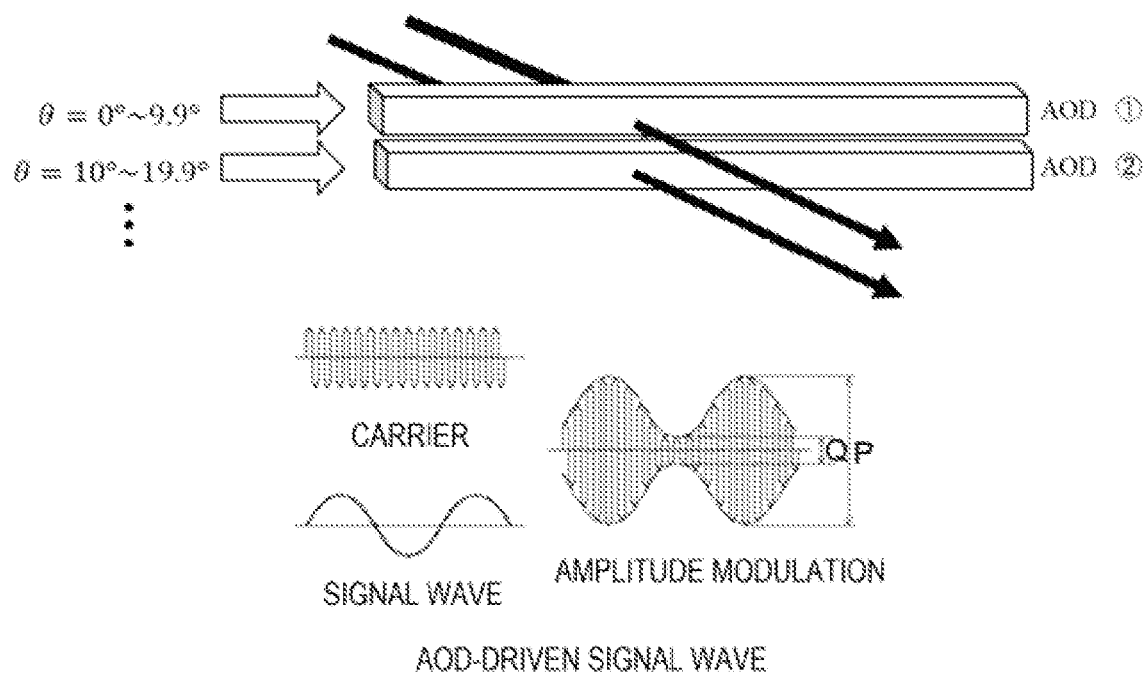
FIG. 10 is a structural diagram of a holographic multiplex recording process.

A second parallel reproducing method disclosed in the present patent is shown in FIG. 10. In a direction perpendicular to the shift direction, the AOD corresponding to each reference light has an independent driving frequency, and rows of parallel arranged holograms can be simultaneously reproduced.

The regularity of hologram recording in the unit is the shift multiplexing in the x direction and the shift multiplexing in a y direction perpendicular to the x direction, the shift step dx in the x direction is different from the shift step dy in the y direction. During recording, when the distance dx is moved, the incident angle of the reference light changes at $\Delta\theta$; and when a distance dy is moved, the incident angle of the reference light changes at a.

After being split by the beam splitter, the multiple reference lights are distributed along the y direction, the incident positions differ by dy=62.5 µm, and the incident angles differ by an equal angle a=10°. The medium platform supports the storage medium to change the incident position of the reference light in the unit along the x direction, the incident position changes at the distance dx=5 µm, and the beam splitter adjusts all the incident angles of the reference light with synchronous change of $\Delta\theta=0.1°$.

Figure 9:
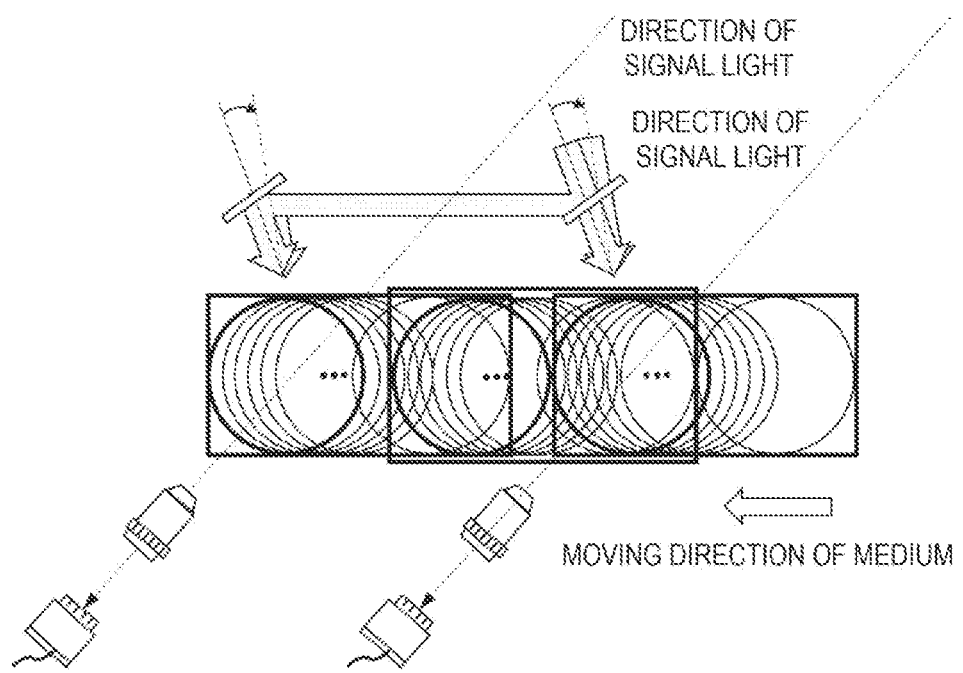
FIG. 9 is a system structure diagram of a simultaneous reading and writing principle.

As shown in FIG. 9, the patent also discloses a parallel reproducing hologram checking method. For the entire system, both holographic recording and a CD-ROM drive require a function of "post-write reading and checking", which is easily accomplished using the method proposed by the present patent.

Referring to FIG. 11, the reference light interferes with the signal light on the storage medium supported by the medium platform to form holographic storage image information. The beam splitter splits the reference light into two beams, in which one beam of the reference light is a recording reference light that interferes with the signal light to record information on the holographic disk, and the other beam of the reference light is a checking reference light for checking whether the recorded information is correct or not. Signal light reproduction is generated on the storage medium supported by the medium platform, and the reading device reads the signal light and is used. As shown in FIG. 9, for the storage medium that reads angle-shift multiplexing, the beam splitter splits the reference light and controls the incident position of the recording reference light to move the shift step dx=5 µm, the incident angle changes by $\Delta\theta=0.1°$, and the checking reference light has the same change rule for the incident angle with the recording reference light, and when positioned at a distance of an integer i times with a shift step L, i=L/dx, the incident angle lags behind the recording reference light by $\Delta\theta \times i$.

Obviously, the above embodiments of the present patent are merely examples for clear illustration of the present patent, and are not intended to limit the implementations of the present patent. Any modification, equivalent substitution, improvement, or the like within the spirit and principle of the claims of the patent should be included in the scope of the claims of the patent.

The invention claimed is:

1. A high-speed parallel reproducing holographic disk reading method, comprising:
    performing multiplex recording of a hologram by linearly moving a medium and changing an incident angle of a reference light at each shift position; and
    splitting the reference light to enter a corresponding position to form a hologram and realizing high-speed parallel reading of information in a reproduction process.

2. The high-speed parallel reproducing holographic disk reading method according to claim 1, wherein split reference lights are incident on a storage medium at a same incident angle.

3. The high-speed parallel reproducing holographic disk reading method according to claim 1, wherein a reading position of a multiplex recording hologram is adjusted by changing an interval of each reference light.

4. The high-speed parallel reproducing holographic disk reading method according to claim 1, wherein hologram sequences in a direction perpendicular to a shift direction are parallel to each other so as to realize parallel reading.

5. The high-speed parallel reproducing holographic disk reading method according to claim 1, wherein the incident angle and a wavelength of each light beam can be determined at a time when it is required to correct each reference light of the Bragg condition.

6. The high-speed parallel reproducing holographic disk reading method according to claim 1, wherein the incident angles of multiple reference lights can be changed independently to improve a signal-to-noise ratio when the Bragg condition is broken.

7. A high-speed parallel reproducing holographic disk reading method for a storage medium including at least angle-shift multiplexing, comprising: splitting a reference light to enter a plurality of different positions on the storage medium in a reproduction process, wherein incident angles are obtained at the plurality of different positions during angle multiplex recording.

8. The high-speed parallel reproducing holographic disk reading method according to claim 7, wherein the incident angles of multiple split reference lights differ by an equal angle.

9. The high-speed parallel reproducing holographic disk reading method according to claim 7, wherein an incident position of the reference light in a unit is changed by movement and all the incident angles of multiple reference lights after splitting are changed accordingly and synchronously according to reference light angles corresponding to different incident positions during recording.

10. The high-speed parallel reproducing holographic disk reading method according to claim 9, wherein a regularity of hologram recording in the unit is shift multiplexing in an x direction and the shift multiplexing in a y direction perpendicular to the x direction, a shift step dx in the x direction is different from a shift step dy in the y direction, and an incident angle of the reference light changes at $\Delta\theta$ when a distance dx is moved and changes at a when a distance dy is moved during the recording.

11. The high-speed parallel reproducing holographic disk reading method according to claim 10, wherein the multiple reference lights after splitting are distributed along the y direction, and the incident angles differ by an equal angle a.

12. The high-speed parallel reproducing holographic disk reading method according to claim 10, wherein the incident position of the reference light in the unit is changed by moving along the x direction, the incident position changes at the distance dx, and all the incident angles of the reference light are synchronously changed at $\Delta\theta$.

13. A high-speed parallel reproducing holographic disk reading device, at least comprising:
 a light source;
 a reference optical path;
 a reading device; and
 a medium platform,
 wherein a light emitted by the light source is split to form a reference light transmitted along the reference optical path, the reference light generates signal light reproduction on a storage medium supported by the medium platform, and the reading device reads the signal light,
 the high-speed parallel reproducing holographic disk reading device further comprising a beam splitter for splitting the reference light, wherein split lights enter a plurality of different positions on the storage medium at the same angle at which the storage medium is recorded to form multiple different signal lights that are read by a plurality of reading devices.

14. The high-speed parallel reproducing holographic disk reading device according to claim 13, wherein, for the storage medium that reads shift multiplexing, the beam splitter splits the reference light to enter a plurality of different positions on the storage medium at a same angle at which shift multiplex recording is performed respectively, so that parallel reading of holograms at different positions is realized.

15. The high-speed parallel reproducing holographic disk reading device according to claim 13, wherein, for the storage medium that reads angle-shift multiplexing, the beam splitter splits the reference light to enter the plurality of different positions on the storage medium, and incident angles are obtained at the plurality of different positions during the angle multiplex recording.

16. The high-speed parallel reproducing holographic disk reading device according to claim 13, wherein, for the storage medium that reads unit storage, angle-shift multiplexing storage is used in each unit, the beam splitter splits the reference light, multiple reference lights after splitting correspond to multiple incident positions spaced apart by a shift step, and the incident angles are obtained at the plurality of different positions in a unit during the angle multiplex recording.

17. The high-speed parallel reproducing holographic disk reading device according to claim 16, wherein a regularity of hologram recording in the unit is the shift multiplexing in an x direction and the shift multiplexing in a y direction perpendicular to the x direction, a shift step dx in the x direction is different from a shift step dy in the y direction, and an incident angle of the reference light changes at $\Delta\theta$ when a distance dx is moved and changes at a when a distance dy is moved during recording.

18. The high-speed parallel reproducing holographic disk reading device according to claim 13, wherein, for the storage medium that reads unit superposition storage, angle-shift multiplexing storage is used in each unit, the beam splitter splits the reference light, the multiple reference lights after splitting correspond to the multiple incident positions spaced apart by a storage unit superposition size on the storage medium, and the incident angles are obtained at the plurality of different positions in the unit during the angle multiplex recording.

19. The high-speed parallel reproducing holographic disk reading device according to claim 18, wherein the regularity of the hologram recording in each unit at least includes the shift multiplexing in the x direction, the shift step in the x direction is dx, the distance dx is moved when the recording is performed, the incident angle of the reference light changes at $\Delta\theta$, a size width of holographic image information in the x direction is defined as Rx, dx=Rx/n, n is a number of times of the shift multiplexing of a hologram in the x direction, a size of the unit in the x direction is 2Rx, the storage medium includes a plurality of units superposed with each other at least in the x direction, and a size of a superposed region of two different units superposed with each other is Rx.

20. The high-speed parallel reproducing holographic disk reading device according to claim 19, wherein after being split by the beam splitter, the multiple reference lights are distributed along the x direction, and incident positions differ by Rx or an integer multiple of Rx, the medium platform supports the storage medium to move in the x direction and change an incident position of the reference light in the unit, the incident position changes at the distance dx, and the beam splitter adjusts all the incident angles of the reference light with synchronous change of $\Delta\theta$.

* * * * *